Figure 1:
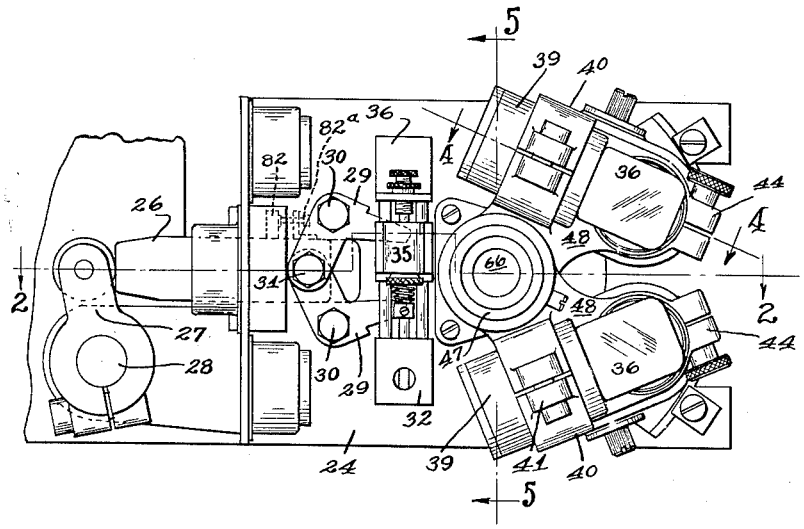

June 13, 1961 W. J. FEDORCHAK ET AL 2,988,218
APPARATUS FOR GAUGING AND INSPECTING GLASSWARE
Filed April 5, 1955 6 Sheets-Sheet 1

INVENTORS
WILLIAM J. FEDORCHAK
RICHARD L. EARLY
BY
Rule & Hoge
ATTORNEYS

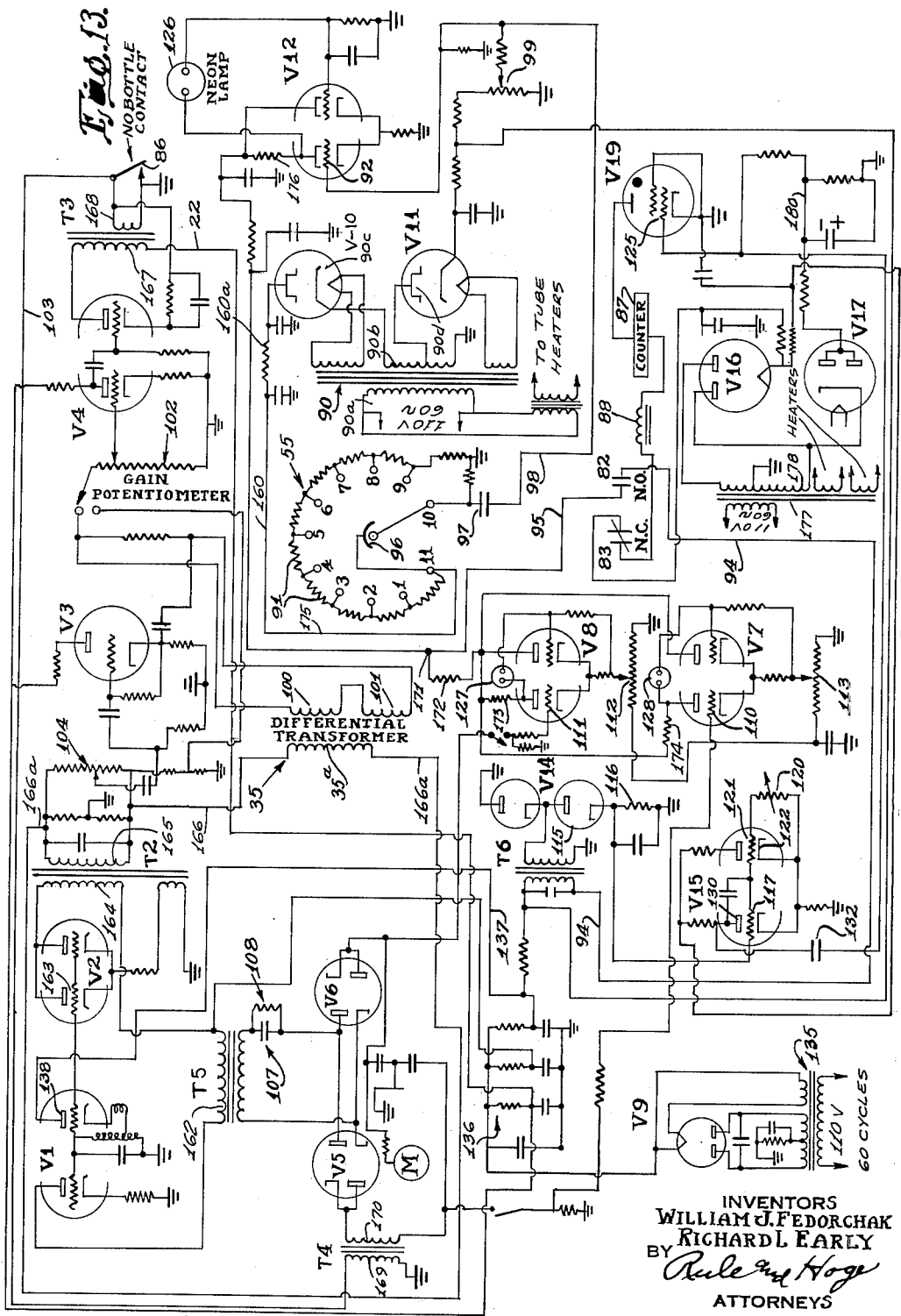

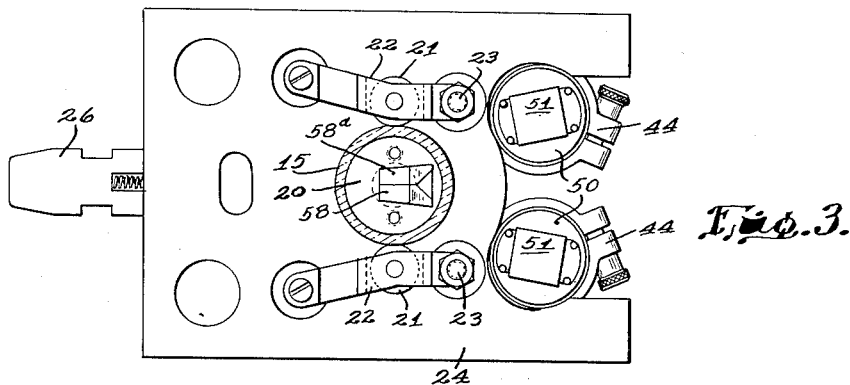
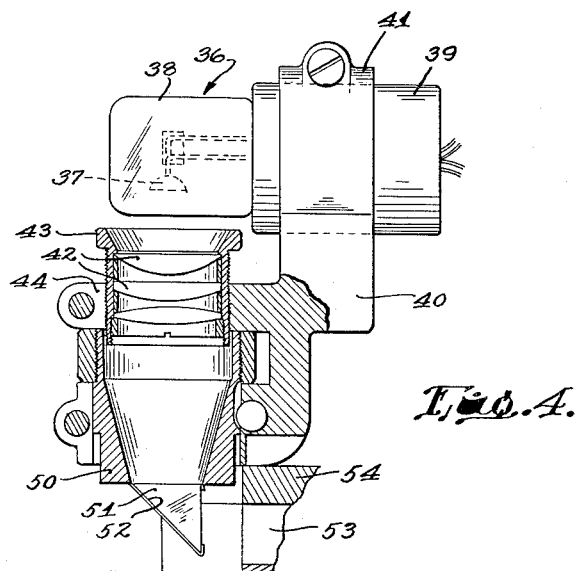
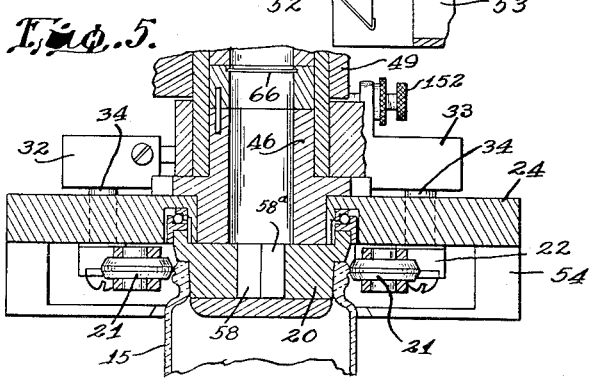
INVENTORS
WILLIAM J. FEDORCHAK
RICHARD L. EARLY
BY
ATTORNEYS

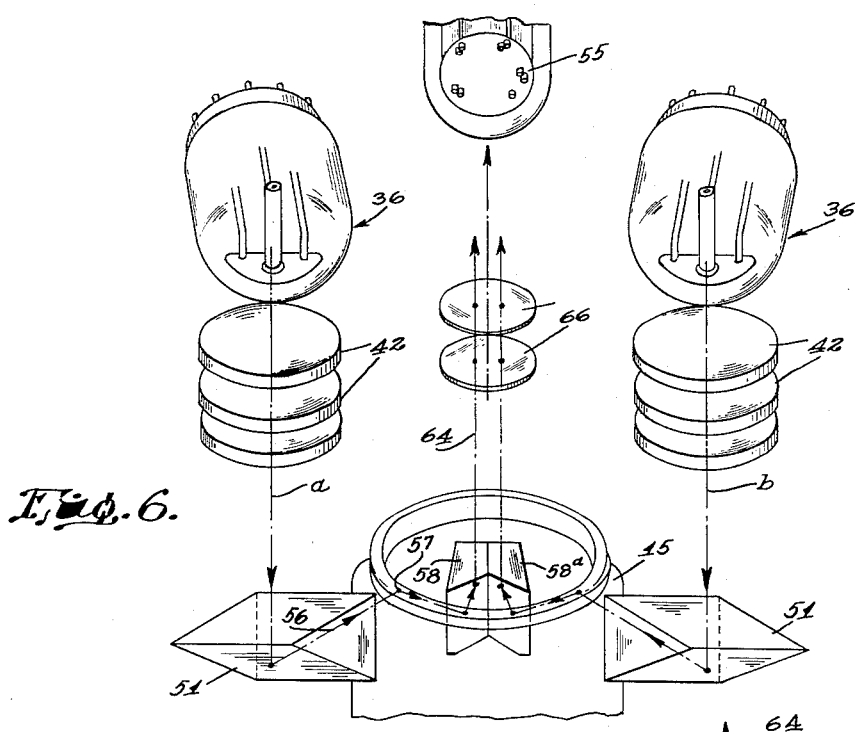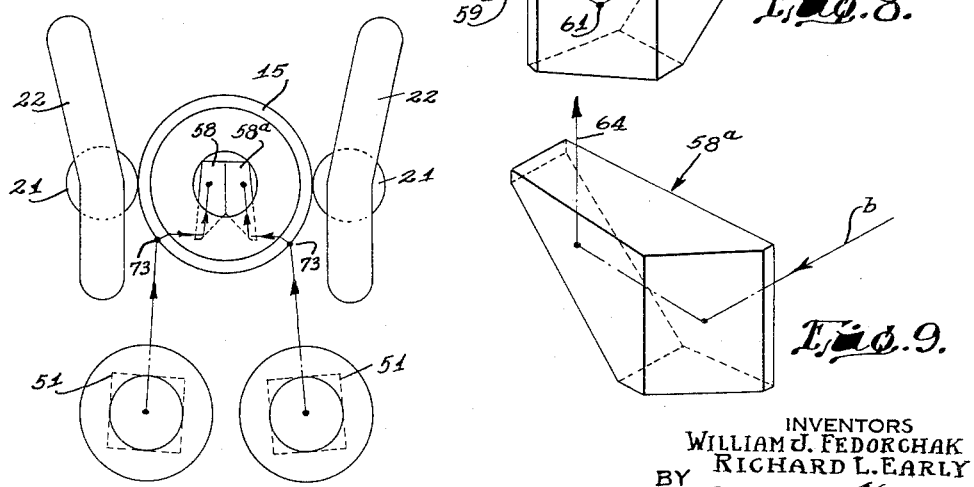

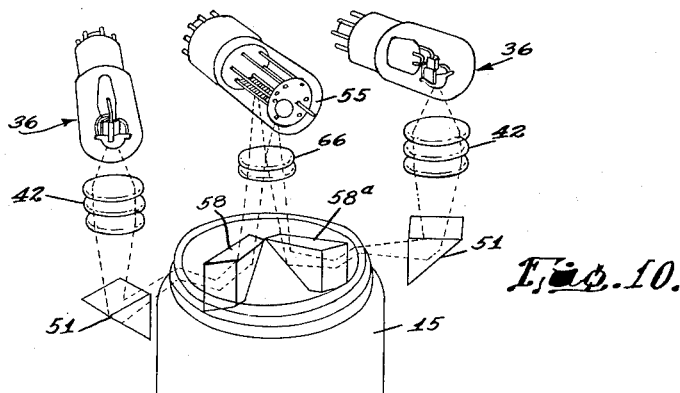
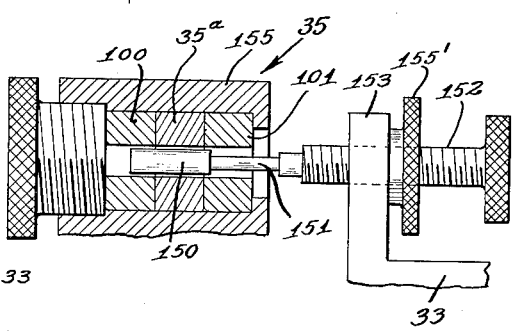
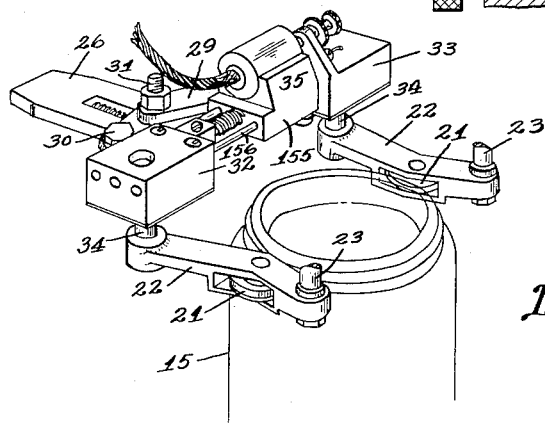
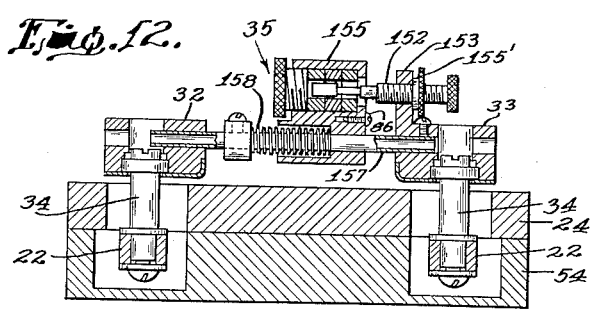
INVENTORS
WILLIAM J. FEDORCHAK
RICHARD L. EARLY
BY Rule and Hoge.
ATTORNEYS June 13, 1961 W. J. FEDORCHAK ET AL 2,988,218
APPARATUS FOR GAUGING AND INSPECTING GLASSWARE
Filed April 5, 1955 6 Sheets-Sheet 6

INVENTORS
WILLIAM J. FEDORCHAK
RICHARD L. EARLY
BY
Rule & Hoge
ATTORNEYS

United States Patent Office 2,988,218
Patented June 13, 1961

2,988,218
APPARATUS FOR GAUGING AND INSPECTING GLASSWARE

William J. Fedorchak, Granite City, and Richard L. Early, Wood River, Ill., assignors to Owens-Illinois Glass Company, a corporation of Ohio
Filed Apr. 5, 1955, Ser. No. 499,394
12 Claims. (Cl. 209—88)

The present invention relates to apparatus for gauging certain dimensions of various articles and also for inspecting the articles for detecting various defects. The invention provides a novel form of apparatus for dimensional gauging concurrently with inspection of the articles for detecting various surface and sub-surface defects, such as cracks, crizzles and the like.

The invention is of utility in gauging round surfaces of glassware, such as the necks or finishes of bottles, jars, and other round articles, and at the same time inspecting the articles by means of a light beam or beam of radiation which scans the surface under inspection. A photoelectric or photomultiplier cell is arranged to be actuated by a change in the radiation beam due to a defect being brought into the path of the beam. The signal from the cell is amplified and used to operate a reject mechanism or other device.

An object of the invention is to provide apparatus for measuring the neck, finish diameter or other dimension of glassware at high speeds and with greater accuracies than has heretofore been attained with prior art apparatus used for this general purpose.

The invention in its preferred form as herein illustrated and described, is designed and adapted for simultaneously gauging and inspecting bottles, jars, or the like which are advanced in rapid succession to the gauging head. Each article is automatically positioned in the gauging head and then rotated about its axis during the gauging and inspection. The diameter of the neck or other surface portion of the article is measured during such rotation by a pair of gauging elements at the same time the surface which is being gauged or other surface of the article is inspected by a beam of radiation. Both the gauging means and the inspecting means are operated through a suitable electrical system to segregate any defective article at a reject station positioned beyond the gauging station.

Gauging and inspecting apparatus of this general character are shown, for example, in the patent to Fedorchak et al. 2,682,802, July 6, 1954, Gauging and Detecting Apparatus. The present invention embodies various modifications, additions, and improvements over the disclosure in said patent. In the present invention a differential transformer is used in combination with and as a part of the gauging means. The transformer is mounted in the gauging head. The relatively movable armature and coil of the transformer are connected to the gauging elements for movement therewith to relative positions determined by the diameter of the surface under test. The transformer is adjusted to give a voltage output which is proportional to the deviation of the said diameter from a predetermined standard. This output is amplified and used to operate the reject mechanism when the diameter is either above or below prescribed limits.

An object of the invention is to attain by the use of a differential transformer, higher speed of operation than with prior art devices, such high speed being permitted by the light weight and structural simplicity of the transformer as compared with other means used for such purpose. The voltage output from the transformer is used also to operate a meter which accurately measures and gives a visual indication of the dimensions of the articles being tested, thus showing at all times the trend in respect to the diameters, in addition to serving as a means for effecting segregation of defective articles.

The invention provides a novel combination of a differential transformer and a photomultiplier cell, the transformer giving an electrical signal for articles which are dimensionally defective, the photomultiplier cell giving a signal for surface defects, detected by scanning with a beam of radiation the signals being effective for operating electric control mechanism common to both.

A further object of the invention is to provide novel means for preventing a false signal when a workpiece is missing from the gauging head during a cycle of operations.

Other objects of the invention will appear hereinafter.

Figure 2:
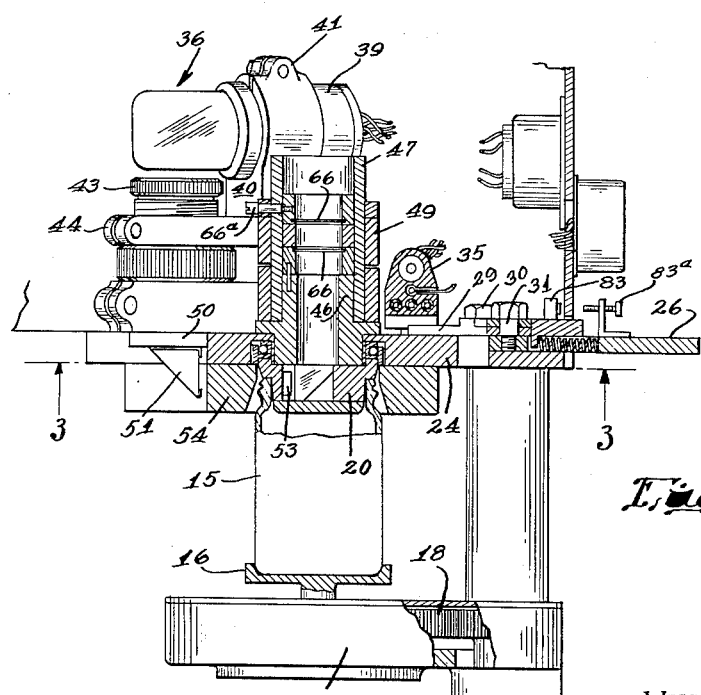
Figure 14:
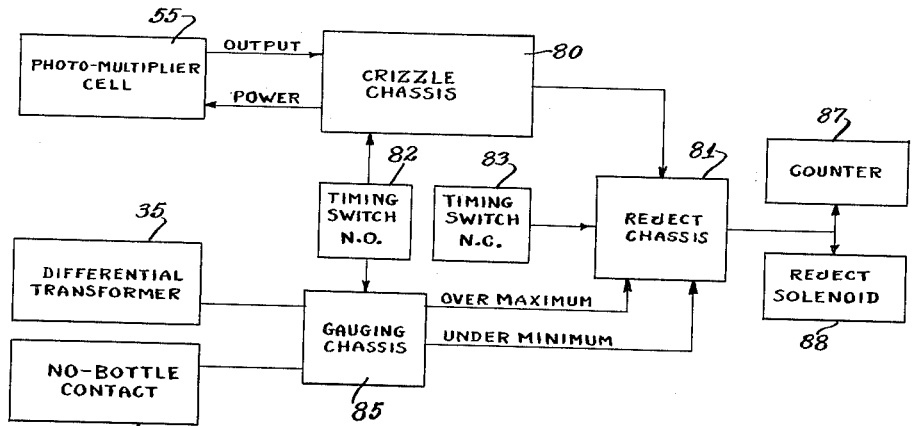
Figure 15:
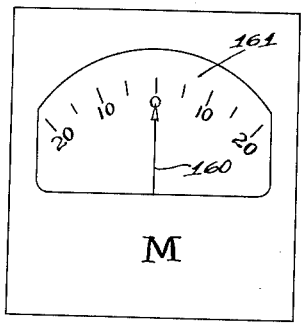

Referring to the accompanying drawings:
FIG. 1 is a plan view of an apparatus embodying a preferred form of my invention;
FIG. 2 is a sectional elevation, the section being taken at the line 2—2 on FIG. 1;
FIG. 3 is a bottom plan view of the apparatus;
FIG. 4 is a section at the line 4—4 on FIG. 1, showing particularly an arc lamp, condensing lenses and a reflecting prism;
FIG. 5 is a section at the line 5—5 on FIG. 1, showing a glass jar in position for inspection and gauging;
FIG. 6 is a schematic diagram showing the light sources and the paths of the light beams;
FIG. 7 is a diagrammatic view of a modification, showing the paths of the radiation beams;
FIGS. 8 and 9 are respectively right-half and left-half views of Abbe prisms;
FIG. 10 is a diagrammatic illustration of crizzle detecting apparatus comprised in one form of our invention;
FIG. 11 is a partly diagrammatic perspective view of the gauging apparatus;
FIG. 12 is a sectional elevation of the differential transformer and its mounting;
FIG. 12A is a sectional view of the differential transformer, on a larger scale;
FIG. 13 is a wiring diagram of the electrical control mechanism;
FIG. 14 is a block diagram indicating the various gauging, inspecting and other operations;
FIG. 15 is a diagrammatic view of the gauging meter; and
FIG. 16 is a partly diagrammatic plan view of means for conveying the jars to and from the inspecting station and means for discharging defective ware at the reject station.

The drawings include apparatus substantially similar to certain apparatus shown and claimed in U.S. Patent No. 2,868,061, having a copendency herewith.

Referring to FIGS. 1 to 5 of the accompanying drawings, the apparatus shown is adapted for gauging and inspecting hollow glass containers such as jars 15, particularly for gauging the diameter of the jar neck or finish and also for inspecting the rim surface or finish of the jar for detecting surface defects. During inspection the jar is supported on a pad 16 (FIG. 2) which is journalled in a carrier frame 17 and rotates about a vertical axis. The means for rotating the pad includes a train of gearing 18. The pad 16 and the frame 17 are movable vertically for lifting the jar into position for testing. The means for lifting, lowering, and rotating the pad 16 with the jar thereon may be the same as disclosed, for example, in the aforementioned patent to Fedorchak et al. 2,682,802. As the jar is lifted to the testing position, a centering cone 20 enters the mouth of the jar and holds it against lateral displacement. The jar is rotated about its axis during the inspection and gauging operation.

Figure 16:
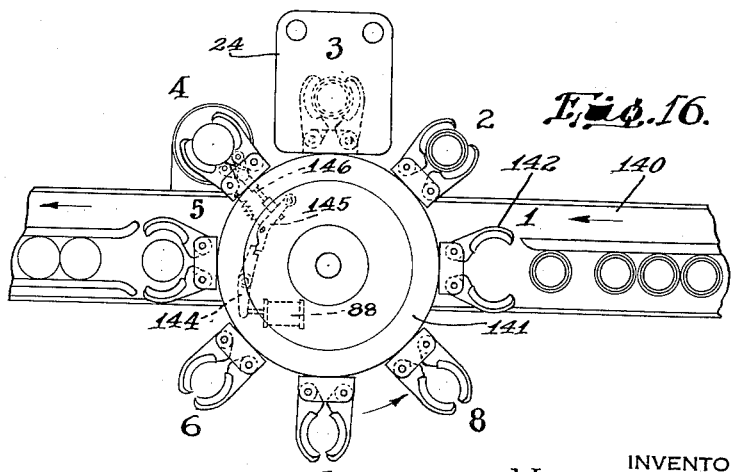

Referring to FIG. 16, the means for conveying the jars to and from the inspecting station includes a horizontally traveling conveyor 140 by which the bottles are brought to a transfer carriage 141. The carriage has mounted thereon a series of transfer elements or carrying heads each comprising a pair of gripping jaws 142. The carriage is rotated intermittently step-by-step counterclockwise thereby bringing each unit 142 to stations numbered 1 to 8 inclusive, station 3 being the inspecting station. This transfer mechanism may be substantially the same as fully disclosed in the patent to Fedorchak 2,371,748, March 20, 1945, Article Handling Apparatus. At the inspecting station 3, the jaws 142 are opened to release the jar for the inspection. After the inspection the article is again gripped and carried from the inspection station 3 to station 5 where the jaws are again opened to release the inspected article to the conveyor 140, unless the article has registered a defect such as hereinafter described. If the article is defective it is automatically released at station 4, herein referred to as the reject station. The means for releasing the jar at this station includes the reject solenoid 88. The solenoid is operatively connected to a rock arm 144 which, when the solenoid is energized, releases a latch 145. Normally the gripping jaws are held closed while passing through the reject station 4. When the latch 145 has been released by the electromagnet the gripping jaws are opened by spring actuated means 146 when the reject station is reached, thereby dropping the defective article. For a more detailed description of this reject mechanism reference may be had to the above identified Patent 2,371,748.

The external diameter of the jar neck or finish is gauged by means of a pair of gauging rolls 21 mounted on a pair of gauging arms 22. These arms are positioned on the lower side of a supporting plate 24, the arms being connected to pivots 23 which extend upwardly through openings in the plate 24. The rolls 21 are yieldingly held in engagement with the workpiece during the test while the workpiece is rotated. The means for spreading the gauging arms 22 and releasing the workpiece comprises a slide bar 26 mounted for lengthwise sliding movement on the plate 24. The bar 26 is moved in a forward direction for spreading the gauging arms by means of a rock arm 27 (FIG. 1) on a vertical rock shaft 28 which is periodically rocked in a conventional manner. The means for rocking the shaft 28 may be the same as disclosed in the aforementioned patent. Operating connections between the slide bar 26 and the gauging arms comprise a pair of bell crank levers 29 which rock about the pivots 30. The bell cranks are connected to the slide bar by a pivot pin 31. The forward ends of the bell cranks 29 extend between a pair of slidable members 32 and 33 (FIG. 11), said members being connected by pins 34 to the free ends of the gauging arms 22.

A normally open timing switch 82 (FIG. 1) is closed by a contact screw 82ᵃ on the slide bar 26 while the latter is in its retracted position and remains closed during the gauging period. When the gauging operation is completed and the slide bar 26 moves forward to spread the gauging rolls, the switch 82 is opened and a normally closed timing switch 83 (FIG. 2) is closed by a contact screw 83ᵃ mounted on the slide bar. The function of these switches is described hereinafter.

Referring to FIGS. 11, 12 and 12A, a differential transformer 35 is operatively connected to the gauging arms 22. The connection between the transformer and said arms includes connecting members or blocks 32 and 33 carried on pivots 34, providing pivotal connection between the gauging arms and said blocks. The transformer comprises the primary coil 35ᵃ and the secondary coils 100 and 101. These coils are mounted in a carrier 155. The carrier is mounted on a pair of rods 156 (FIG. 11) attached to the block 32 and extending between the blocks 32 and 33. A rod 157 attached to the block 33 is positioned between the rods 156 and has sliding connection with the block 32. A coil spring 158, mounted on the rod 157, is held under compression between the carrier 155 and a stop on the rod 157 and holds the gauging rolls 21 against the jar 15 with a yielding pressure during the gauging operation. The differential transformer comprises a core 150 carried on a stem 151 connected to or formed with an adjusting screw 152 threaded through a wing 153 on the block 33. This construction permits adjustment of the core 150 in the direction of its length. Lock nut 155′ holds the parts in adjusted position.

Relative movement of the gauging rolls 21 toward or from each other during the gauging operation imparts a corresponding relative movement to the coils and core of the transformer. This relative movement of the transformer parts is amplified owing to the position of their connections with the gauging arms. Thus, in the construction shown, the relative movement of the transformer parts is about two and one-half times that of the gauging rolls.

The relative movement of the transformer elements gives a voltage signal which varies with the extent of such movement. This signal is amplified and, as hereinafter described, operates the meter M (FIGS. 13 and 15). The meter comprises a pointer 160, which is adjusted to point to zero when the diameter of the jar or work piece under test is ideal or normal. The meter as hereinafter described indicates on the scale 161 any deviation from the standard diameter for which the operation is adjusted and also indicates by the direction in which the pointer 160 swings, whether such diameter is above or below the required standard. The amplified signal from the differential transformer is also used for effecting the operation of the reject mechanism when the diameter of the work piece is either above or below a permissible tolerance.

The means for inspecting the containers 15 for surface defects such as cracks, and crizzles, comprises separate light sources 36. These consist of concentrated-arc lamps. The electrodes 37 (FIG. 4) are mounted in a glass envelope 38 carried by an insulating sleeve or case 39. Each lamp is mounted in a bracket 40 having a split sleeve 41 in which the lamp is clamped. The radiation of the lamp may consist largely of blue, violet and ultra-violet rays. The beam of radiation is directed downwardly through condensing lenses 42 mounted in a shell 43. The bracket 40 is formed with a split collar 44 by which the shell 43 is clamped in the bracket. The brackets 40 with the lamps and condensing lenses carried thereby, are mounted on a tubular support comprising an inner tubular member 46 mounted in the base plate 24 and a sleeve 47 surrounding the tube 46. The brackets 40 are formed with arms 48 and integral bearing collars 49 surrounding the sleeve 47.

A reflecting prism 51 is mounted or carried in a tubular holder 50 mounted in the bracket 40. The prism is formed with a reflecting surface 52 which may be inclined at 45° and which reflects the light beam horizontally, directing it against the rim or sealing surface of the container. The horizontal beam reflected from the surface 52 is directed through a channel 53 formed in a plate 54 attached to the under surface of the base plate 24. The centering cone 20 has mounted therein reflecting prisms by which the radiation is reflected upwardly to a photo-multiplier cell 55 (FIG. 6) mounted above and in vertical alignment with the jar 15.

The paths of the light beams a and b are indicated in FIG. 6 by the broken lines and arrowheads. As here shown, the beam a, propagated from the lamp 36, is reflected by the prism 51 in a horizontal direction 56 to a point 57 on the rim or finish of the jar 15. The radiation deflected at the point 57 after passing through the glass wall of the jar is directed against the prism 58 by which it is reflected and directed vertically upward to the cell 55. The prism 58 as here shown is an Abbe prism comprising separate right and left halves as shown isometrically in FIGS. 8 and 9. The prism 58 as shown in FIG. 8 is formed with a horizontal upper face 59, a vertical face 59a, a vertical face 60 and an inclined face 62. The ray *a* enters the prism through the face 59a and strikes the face 60 at the point 61. The radiation reflected from the surface 60 strikes the inclined face 62 of the prism at the point 63 and is reflected therefrom, the reflected ray being in the vertical line 64.

The prisms 58 and 58a (FIGS. 8 and 9) are of similar construction, being right and left hand prisms respectively. The radiation units, each comprising an arc lamp 36 (FIG. 6), condensing lenses and reflection prisms are symmetrically arranged on opposite sides of the axis of rotation of container 15. The beams directed horizontally against the rim of the container may be radial thereto and preferably substantially at right angles to each other. Thus they are convergent at an angle of about 90°.

Polaroid filters 66 are mounted in the path of the vertical radiation between the reflecting prisms and the photo-multiplier cell 55. These filters are in the form of horizontal disks and are adjustable by relative rotation to regulate the normal light level to operate the photo-multiplier tube 55 within the range of its greatest sensitivity level. As shown in FIG. 2 the polaroid disks 66 are mounted in sections of the tubular member 46. The section carrying the upper disk is rotatable for adjusting the disk and is held in adjusted position by a clamping screw 66a.

In operation, the jar 15 is placed on the pad 16 while the latter is in its lowered position. The pad is then raised, bringing the jar to position for testing with the centering cone 20 protruding into the jar. While in this position the jar is rotated so that the radiation beams scan the surface against which they are directed. Rotation is through a sufficient angle to cause both of the beams to scan the entire circumference of the surface under test. Any crack, crizzle or other surface defect when brought within the range of either of the radiation beams causes a sudden change in the value or intensity of the beam of radiation striking the cell 55. This causes the cell to give a voltage signal. The signal is transmitted through an electrical system by which it is amplified and caused to operate the reject mechanism when the jar is brought to the reject station. The electrical system which receives the signals from the photomultiplier cell also receives signals from the differential transformer for operating the reject mechanism, as hereinafter described.

In FIG. 10 the reflecting prisms 51 and the prisms 58, 58a are so arranged that the radiation beams strike the rim of the jar at substantially diametrically opposite points. In this arrangement the two sections of the Abbe prism are spread apart as indicated.

FIG. 7 diagrammatically illustrates an arrangement in which radiation beams from the two light sources are directed against the container 15 in approximately parallel paths. The beams strike the rim of the container at points 73 which may be 90° apart, more or less, circumferentially of the container. The radiation strikes the outer surface of the container and is deflected as it enters the glass and again as it emerges at the inner surface of the container so that said beams are directed toward each other, strike the reflecting prisms and are directed upwardly therefrom.

The term light beam as herein used is intended to include any beam of radiation to which the photomultiplier cell is responsive, whether within or beyond the visible range. The term crizzle is used generically to include cracks, checks or other defects to which the photoelectric cell is responsive.

Referring to the block diagram (FIG. 14), when the photomultiplier cell 55 is energized by a sudden change in the degree of radiation striking the cell when light is reflected from a crizzle or defect in the jar finish or other surface under test, the output voltage generated thereby is transmitted to a diagram (FIG. 14), when the photomultiplier cell 55 is eneregized by a sudden change in the degree of radiation striking the cell when light is reflected from a crizzle or defect in the jar finish or other surface under test, the output voltage generated thereby is transmitted to a crizzle chassis 80. This voltage is here fed into a memory circuit which holds it until the end of the gauging and inspecting. It is then fed to a reject chassis 81 in which the voltage goes into another memory circuit by which it is held until the proper time for actuating a reject latch on the transfer device (FIG. 16). It then goes to a reject solenoid 88 which sets the reject latch so that the gripping jaws are opened at the reject station. The crizzle chassis is energized by closing a normally open timing switch 82 which is held closed during the gauging and inspecting period. The switch 82 is then opened so that the crizzle chassis is de-energized during the bottle handling period between the inspecting periods. A normally closed timing switch 83 is held closed and energizes the reject chassis 81 during the bottle handling period, and is then opened and de-energizes the reject chassis during the inspecting and detecting period.

During the gauging operation which takes place concurrently with the inspection for crizzles, the gauging rolls 21 ride the jar finish or surface under test and move the core of the differential transformer 35 relative to the transformer winding in accordance with any variations in the finish diameter. Owing to the relative position of the gauging rolls and transformer parts at their points of connection with the gauging arm 22 the relative movement of the transformer elements is multiplied. In the construction shown a change of .001″ in the finish diameter moves the transformer core relative to the winding approximately .0025″.

The differential transformer secondary transmits an alternating current voltage to the gauging chassis 85. The magnitude of this voltage depends upon the relative position of the transformer windings and the transformer core, and is in direct proportion to the deviation of the finish diameter from normal or ideal. If the finish diameter is either above or below the allowable tolerance, the voltage is sufficient to operate a memory circuit in the gauging chassis, otherwise the memory circuit is not operated. From this point on the action is the same for an off gauge jar or workpiece as for one with a crizzled finish. During the detection period the crizzle detection system and the gauge system are operating concurrently.

The "no-bottle contact" 86 (FIGS. 12, 13, 14) is for the purpose of preventing the gripper jaws from opening at the rejection station on empty jaws, and also to prevent operating the counter on empty jaws. As shown in FIG. 12 this contact is in the form of a screw. When there is no bottle or workpiece in the head the differential transformer elements are moved beyond the limit for an under gauge test. This brings the contact 86 into contact with the grounded metal part 33 and thereby grounds the output voltage of the differential transformer. The contacts are connected into the gauging chassis in such a way as to desensitize the gauging circuits when so grounded. Such grounding out occurs before the normally open timing switch 82 closes so that there is no false indication given by the reject counter 87. The reject solenoid 88 and counter 87 are connected over the same line to the reject chassis so that the counter works only when the reject solenoid is energized.

The electric control system as illustrated in the wiring diagram (FIG. 13) will now be described. This system includes the photomultiplier cell 55 for receiving signals from the optical inspecting means, and the differential transformer 35 which supplies signals from the gauging apparatus. The photomultiplier cell 55 is of well-known construction including the cathode 96 which receives the light signals. The voltage supplied to this cell is divided into equal parts by the resistors 91 connected in series between the dynodes (contact pins) numbered 1 to 9, a resistance between dynode 9 and ground, and a resistance between dynode 1 and cathode contact 11. The voltage between the dynode 9 and the ground is available as the output voltage of the photomultiplier cell. Contact pin 10 is connected to the anode.

A transformer 90 has its primary 90a connected to any suitable source of alternating voltage supply. As indicated it is connected across the mains of a 110 volt 60 cycle system. Half wave rectifiers V10 and V11 receive voltage from the transformer 90, the cathode 90c of tube V10 and plate 90d of tube V11 being connected to the secondary 90b of the transformer. The half-wave rectifier V10 supplies a negative voltage for operating the photomultiplier cell 55, the plate of the tube V10 being connected through a lead 160 to the dynode 11 of the cell 55. The voltage output of the tube V10 is held essentially constant by a filter network 160a.

A trigger tube V12 is connected, as presently described, to receive a regulated positive grid voltage from the half wave rectifier V11. The tube V12 is a bi-stable multivibrator, that is, it is stable with either half conducting and the other half cut off. Some action must be initiated to reverse it.

A transformer 135 (lower left-hand corner of the diagram) receives its voltage from any suitable source. As indicated it may be connected across the mains of a 110 volt 60 cycle system. A full wave rectifier tube V9 receives its voltage from the secondary of the transformer 135. The tube V9 supplies voltage to the primary of the transformer T6, this voltage being transmitted from the tube V9 through a voltage divider network 136 to the primary of the transformer T6. The transformer T6 supplies a plate voltage to both halves of the tube V12 during the gauging operation. During this operation the normally open timing switch 82, heretofore described, is closed and thereby provides a circuit from the transformer T6 to the two halves of the tube V12. Such circuit may be traced from the transformer through the lead 94, timer switch 82, and leads 95, 175, the circuit being extended to the two plates of the tube V12.

Referring to the tube V1 (at the upper left-hand corner of the corner of the diagram) the right half of the tube is an oscillator generating an oscillating current voltage. Power is supplied to the tube V1 by the transformer 135 through the tube V9, voltage divider network 136, and a lead 137 to the plate 138 of the oscillator. The voltage generated by the oscillator appears between the grid of the tube and ground. This voltage is fed through the left half of the tube V1 to the primary 162 of a transformer T5. This is a fixed voltage and does not change with variations in the diameter of the workpiece under test.

A tube V2 has its grids 163 connected to the grids of the oscillator V1 to receive the output of said oscillator. This is also a fixed voltage. A transformer T2 has its primary 164 connected in the plate circuit of the tube V2. The secondary 165 of the transformer T2 is connected through leads 166 and 166a to the primary 35a of the differential transformer 35 for supplying voltage thereto. The output of the differential transformer is fed to a gain potentiometer 102 and thence through both halves of a tube V4 to the primary 167 of a transformer T3. The secondary 168 of the transformer is connected through a lead 103 to the primary 169 of a transformer T4. The secondary 170 of the transformer is connected to phase sensitive demodulator tubes V5 and V6 which thus receive the output of the differential transformer 35. A zero potentiometer 104 and a tube V3 are used for superimposing a small fixed direction voltage on the differential transformer output to make the readings of the meter M correspond exactly with the diameter of the surface which is under test.

Tubes V7 and V8 are bi-stable multivibrators with the left halves normally conducting. They will reverse when the signal voltage fed to their grids 110, 111 is sufficient to drive the left half to the cut off. A bias potentiometer 112 is connected between the cathodes of the tube V8 and ground. The setting of this potentiometer determines the signal voltages required to cut off the tubes V8 and V7. The plate circuit for the tubes V7, V8 and also for the tube V12 extends through the normally open timing switch 82. This circuit may be traced from the primary of the transformer T6 through lead 94, normally open switch 82, lead 95, to point 171, through resistor 172 to the plates of tube V8. A resistor 173 is connected in circuit with the left-hand plate of tube V8. A resistor 174 is connected in circuit with the left-hand plate of tube V7. The plates of tube V7 are connected in parallel with the plates of tube V8. A lead 175 extends from the point 171 to the plates of the tube V12, a resistor 176 being connected in circuit with the left-hand plate.

A thyratron V19 has its plate circuit extending through the counter 87, the reject solenoid 88 and the normally closed timer switch 83. Voltage for this circuit is supplied from a transformer 177. The primary of this transformer may be connected acoss the 110 volt power line as indicated. The secondary 178 of the transformer supplies voltage to a rectifier tube V16 and also to a rectifier tube V17 and its filter 180. The control grid 125 of the thyratron V19 is biased by the rectifier V17 and its filter 180.

*Operation*

The jar 15 to be tested is brought to gauging position (FIG. 11) between the gauging arms 22. The jar is then rotated and any variations in the diameter operate the differential transformer 35 as before described. Concurrently with this gauging operation the rim surface of the jar is scanned by the radiation beam or beams for detecting any crack or other surface defect. When such a defect causes a sudden change in the light beam which strikes the cathode 96 of the photomultiplier cell 55, the cell will deliver a negative voltage to the grid 92 of the tube V12. This voltage is transmitted through the condenser 97 and lead 98. This negative voltage operates to reverse the tube V12. The level of rejection is adjusted by means of a bias potentiometer 99. The biasing of the tube V12 is such that the left half of the tube will conduct while the right half is cut off. If a negative voltage applied to the grid 92 is of such amplitude as to drive the grid to the cut off, the tube will reverse itself instantaneously. The right half will now conduct. The left half will remain cut off until the plate circuit of the tube is opened and closed again by the normally open timing switch 82. This reversal of the tube V12, effected by the signal from the photomultiplier cell, operates as hereinafter described to cause operation of the reject mechanism for segregating the defective jar from those which pass the test. The tubes V7 and V8 also operate in like manner, as presently described, to control the reject mechanism when the gauging mechanism operates the differential transformer 35.

If the core 150 (FIG. 12A) of the differential transformer is in the electrical center, both of the secondary windings 100, 101 will have equal voltages induced in them. The secondary windings are so connected together that their polarities at any instant are opposed to each other. The output of the transformer is zero when the core is in the electrical center. As the core moves from one limit to the other this voltage changes from a maximum in one phase, through zero to a maximum in the opposite phase. When the core is moved away from center by the workpiece under test being out of gauge, the output of the differential transformer is transmitted to the demodulator tubes V5 and V6, as above described.

The output of the transformer T5 is rectified by the tubes V5, V6 and filtered by a condenser 107, producing a pulsating direct current voltage across the condenser and resistor 108. The polarity of this voltage is positive on top and negative on the bottom and its average value is near the peak value of the secondary voltage of the transformer T5. The secondary voltage of the transformer T4 will send a current through the meter M only during the half cycle in which the secondary voltage of the transformer T5 and the direct current voltage of the condenser 107 are in series opposition. During the other half cycle the voltage of transformer T4 would have to exceed the sum of the other two voltages to send a current through the meter. The T5 voltage however does not get that high. The direction of current flow through the meter M is determined by the polarity of the secondary voltage of transformer T5 during the conducting half cycle. The meter M being a direct current meter with its pointer at zero center, an indication of the phase relationship and amplitude of the secondary voltage of transformer T5 is obtained.

Tubes V7 and V8 are bi-stable multivibrators with the left halves normally conducting. They will reverse when the signal voltage fed to their grids 110, 111 is sufficient to drive the left half to cut off. The signal voltage required to cut the tubes off is determined by the setting of a bias potentiometer 112. The tube V7 gets a negative signal when the diameter of the jar under test is over the normal size and the tube V8 gets a negative signal when the diameter of the jar is under normal size. The setting of the potentiometers 112 and 113 determine the rejection points.

After a bottle has been pushed up into the gauging head and the gauging rolls have closed on the jar finish, the normally open timing switch 82 closes and the normally closed timing switch 83 opens. The closing of the normally open timing switch applies plate voltage to the trigger tube V12 in the crizzle chassis and also to the two trigger tubes V7 and V8 in the gauging chassis. The primary of the transformer T6 in the reject chassis is carrying the plate current of these three trigger tubes V7, V8, and V12.

The opening of the normally closed timing switch 83 breaks the plate circuit of the thyratron tube V19 in the reject chassis. Thus the action of the two timing switches energizes the trigger tubes in both the gauging chassis and crizzle chassis and at the same time de-energizes the reject circuit. The timing switches remain in this condition for slightly over one revolution of the jar under test, during which time the jar is gauged as to diameter and inspected for crizzles.

If the jar under test is free from crizzles or other defects which would give a signal through the photomultiplier tube, and is not off gauge, the left half of all three trigger tubes V7, V8, V12 will be conducting at the end of the gauging and inspecting period. These tubes as above described have high plate load resistors 174, 173 and 176 respectively in the plate circuits of the left halves. These high resistors limit the plate current of the tubes V7 and V8 to approximately 1.5 milliamperes each, for example, and that of the tube V12 to approximately .5 milliampere. This makes the combined plate current of the three tubes about three milliamperes. This current is being carried by the primary of the transformer T6.

If the jar under test is defective, one of the trigger tubes will reverse when the defect is encountered so that the right half of that tube will be conducting at the end of the gauging period. The right halves of these tubes V7, V8, V12 have no plate load resistors so that the reversing of any one of these tubes will cause the plate current of that one tube to rise to approximately 4.5 milliamperes. The primary of transformer T6 will then be carrying about 6 milliamperes instead of three milliamperes as it would with a jar free from defects.

At the end of the gauging period, before the jar starts to move out of the gauging head, the normally open timing switch 82 opens and the normally closed timing switch 83 closes. This closes the plate circuit of the thyratron V19 and opens the plate circuit of all three of the trigger tubes V7, V8 and V12. When the plate circuits of the trigger tubes are opened, the magnetic flux built up in the transformer T6 by this plate current collapses. This collapsing flux induces a pulse of voltage in the secondary of the transformer T6. The polarity of this voltage pulse is positive at the top end and negative on the ground end. This positive pulse is passed by the lower half 115 of the tube V14 and appears across the cathode potentiometer 116, and is fed to the grid 117 of the reject trigger tube V15.

This voltage pulse at the grid 117 will be approximately 2 volts if the jar under test is free from defects. It will be approximately 5 volts if a defect has been registered. The reject trigger tube V15 is a one-shot multivibrator. The right half is normally conducting and the left half is cut off. A positive pulse of from 3 to 4 volts or more will reverse the tube, causing the left half to conduct and the right half to be cut off. The tube remains in this condition for a certain length of time and then returns to its normal state. The length of time that the tube stays reversed depends upon the setting of the potentiometer 120 between the grid 121 and cathode 122 of the right half of the tube.

The control grid 125 of the thyratron V19 is biased to a negative potential of about 10 volts by the rectifier V17 and its filter. The counter 87 and reject solenoid 88 are in the plate circuit of the thyratron V19 and will operate whenever the thyratron is fired. The 10 volt negative bias is sufficient to prevent firing of the tube. In order to make it fire a positive voltage high enough to overcome most of the 10 volt negative bias must be delivered to the grid 125 of the thyratron.

The complete action in rejecting a defective jar is as follows: First, either the trigger tube V12 in the crizzle chassis is reversed if the photomultiplier cell receives a signal indicating a defect in the jar, or one of the trigger tubes V7, V8 in the gauging chassis is reversed if the operation of the differential transformer during the gauging period indicates that the gauge of the jar is defective. The right half of the tube thus reversed is therefore conducting and a corresponding signal light is on at the end of the gauging period. These signal lights are supplied by a neon lamp 126 in circuit with the tube V12 which is lighted and gives a signal when a crizzle signal is received, and signal lamps 127 and 128 which give signals respectively when the gauge is above or below the prescribed limits.

The normally closed timing switch 83 closes at the end of the gauging period and applies plate voltage to the thyratron V19. The normally open timing switch 82 opened at the same time and a positive voltage pulse (for example 6 volts) is delivered to the grid 117 of the trigger tube V15 in the reject chassis. This pulse reverses the tube V15 and lowers the voltage at the plate 130. After a short delay during which the jaws 142 (FIG. 16) have closed on the jar and the machine is indexing to bring the next head to a gauging station, the tube 15 reverses itself and the voltage at the plate 130 rises abruptly. This rise in plate voltage is transmitted to the grid of the thyratron V19 through a coupling condenser 132. This pulse overrides the negative grid bias and the thyratron fires, thereby operating the counter 87 and the reject solenoid 88. The reject solenoid sets the reject latch on the spider (FIG. 16) in such a position that the gripping jaws 142 open at the reject station 3 when the other gripping jaws open, thus dropping the jar into a cullet chute. At the beginning of the next cycle the normally closed timing switch 83 is opened and the reject solenoid 88 is de-energized.

Modifications may be resorted to within the spirit and scope of our invention.

We claim:

1. Apparatus for gauging round surfaces of jars or other articles, comprising means for bringing said articles in succession to a gauging station, a pair of gauging elements mounted at said station, means for rotating each article about its axis at said station, blocks connected to the gauging elements respectively, a differential transformer comprising a core, a primary coil and secondary coils, a carrier in which said coils are mounted, the carrier being positioned between said blocks and connected to one of said blocks, spring means interposed between the carrier and the other of said blocks and holding the gauging elements in contact with the round surface of the article at diametrically opposite points during said rotation, the transformer core being connected to the last mentioned block for movement therewith relative to the said carrier and coils when the gauging elements are relatively moved during said rotation of the article, means for supplying alternating voltage to the primary coil of the transformer and thereby inducing voltage in the secondary coils, the secondary coils being so connected that their polarities at any instant are opposed to each other and their voltage output zero when the article under test is of a prescribed diameter, said secondary coils having an output voltage produced therein of a value dependent upon the relative positions of the transformer elements and variable with variations in said relative positions, and signaling means actuated by the said output.

2. The apparatus defined in claim 1, said apparatus including a meter indicating the extent of the relative movement of the gauging elements.

3. Apparatus for gauging a round surface of a jar or other article comprising means for supporting the article and rotating it about a vertical axis, a pair of gauging arms positioned at opposite sides of the article, said arms each pivoted at one end for swinging movement to and from the surface under test, a differential transformer comprising a core or armature and differential coils, supporting elements carrying respectively said core and said coils, said elements being pivotally mounted respectively on the free ends of the gauging arms, means for applying an operating voltage to the transformer, and signal means operated by the output voltage of the transformer.

4. Apparatus for inspecting round surfaces of articles, said apparatus comprising means for bringing the articles singly and in succession to an inspection station, automatic means for rotating each article about its axis while at said station, gauging arms, gauging rolls on said arms, means for mounting the arms for movement into and out of gauging position in which the rolls are in contact with the surface under test, a differential transformer comprising a transformer core and coils mounted respectively for movement with the gauging arms, an electrical control system comprising a normally closed timing switch, means for automatically opening said switch at the commencement of a gauging operation and automatically closing it at the end of the gauging operation, a normally open timing switch, means for closing and opening the latter respectively at the beginning and ending of the gauging operation and maintaining it in closed position during such gauging operation, a memory circuit including said normally open switch and to which the output voltage of the transformer is transmitted and by which it is held during the gauging period, and an ejector mechanism in circuit with the normally closed switch.

5. Apparatus for gauging round surfaces of articles comprising means for bringing the articles in succession to a gauging station, means for rotating each article while at said station during a gauging operation, means for advancing the gauged articles beyond said station, gauging means comprising a pair of gauging arms, gauging rolls carried by said arms, means for positioning each article between the gauging rolls at said station, means for holding the gauging rolls on said surface during the rotation of the article, a differential transformer comprising a core and coils mounted respectively for movement toward and from each other with the gauging arms, means for supplying an operating voltage to the transformer and causing the same to give an output voltage corresponding to the diameter of the surface under test, article rejecting means for segregating defective articles from those which have passed the test, a multivibrator, means controlled by the output voltage of the transformer to invert the multivibrator when the diameter of the surface under test is outside of prescribed permissible limits, a thyratron, means controlled by said inverting of the multivibrator to cause the thyratron to conduct, and a reject solenoid in the plate circuit of the thyratron and operable when energized to cause operation of said reject mechanism.

6. The apparatus defined in claim 5, said apparatus including means for preventing the operation of the said rejecting mechanism when an article is missing at the gauging station, permitting the gauging arms to be brought closer together than when gauging an article, said preventing means comprising a switch operatively connected to one of the gauging arms, said switch being in a circuit through which the output voltage of the differential transformer is fed and thereby operable to ground said circuit.

7. Apparatus for gauging the diameters of round surfaces of articles, said apparatus comprising means for automatically bringing the articles singly and in succession to a gauging station, means to rotate each article while at said station during the gauging operation, means for advancing each article beyond the gauging station at the completion of the gauging operation, gauging mechanism at said station comprising a pair of gauging arms, gauging rolls on said arms, means for yieldingly drawing the arms toward each other and thereby holding the gauging rolls on the surface under test during the rotation of the article, a differential transformer including a core connected to one gauging arm for movement therewith and a transformer winding connected for movement with the other arm, means for supplying an operating voltage to the transformer and causing the latter to give an output voltage corresponding to the relative positions of the gauging arms, a reject mechanism for separating those articles of greater or less diameter than a prescribed permissible range of diameters, multivibrators, means controlled by the output voltage of the transformer for inverting one of said multivibrators when the diameter of the surface under test is greater than a prescribed maximum limit and for inverting the other multivibrator when the diameter is less than a prescribed minimum limit, a thyratron, means controlled by the inverting of either of said multivibrators to cause the thyratron to conduct, a relay in the plate circuit of the thyratron, means operable by said relay to cause operation of said reject mechanism.

8. The apparatus defined in claim 7, including means actuated by movement of the gauging arms toward each other during a gauging operation when the station is empty and thereby operable to prevent the operation of said reject mechanism, said preventing means comprising a switch operatively connected to one of the gauging arms, said switch being connected in a circuit through which the output of the differential transformer is fed and thereby operable to ground said circuit.

9. Apparatus for gauging round surfaces of jars or other articles, comprising means for bringing said articles in succession to a gauging station, a pair of gauging elements mounted at said station, means for rotating each article about its axis at said station, means for holding the gauging elements in contact with the round surface of the article at diametrically opposite points during said rotation, a differential transformer comprising a core, a primary coil and secondary coils, the core and said coils being operatively connected respectively for movement with the said contact elements, means for supplying alternating voltage to the primary coil of the transformer and thereby inducing voltage in the secondary coils, the secondary coils being so connected that their polarities at any instant are opposed to each other and their voltage output zero when the article under test is of a prescribed diameter, said secondary coils having an output voltage produced therein of a value dependent upon the relative positions of the transformer elements and variable with variations in said relative positions, signaling means actuated by the said output, a reject mechanism, a solenoid controlling the operation of the reject mechanism, a bi-stable multi-vibrator tube, means controlled by a voltage output of said secondary coils to apply voltage to the multi-vibrator tube and thereby reverse it, the electro-responsive means controlled by the output of said multi-vibrator for energizing said solenoid and thereby effecting the operation of said reject mechanism for segregating a defective article from the other articles when the apparatus indicates a deviation in the diameter of the article under tests above or below a prescribed limit.

10. Apparatus for gauging a diameter of a round surface of an article comprising means for rotating the article under test about the axis of its said surface, a pair of gauging elements, means mounting said gauging elements to engage the said surface of the article under test at diametrically opposite points, a differential transformer having windings and a core, means for energizing the input windings of said transformer, means connecting the gauging elements to the differential transformer for relatively moving its core and windings in response to movement of said gauging elements, said movement resulting in a transformer output voltage proportional to gauging element motion, means connected to said transformer for amplifying said output voltage, and means connected to said amplifying means for indicating a deviation in the diameter of said surface above or below a prescribed limit and actuated by an amplified output voltage that exceeds a predetermined magnitude.

11. Apparatus for gauging a round surface of a glass jar or other glass article and selecting said articles according to a preselected range of dimensions of said surface comprising means for rotating the article about the axis of its said surface at a gauging station, gauging arms, gauging rolls connected on said arms, means for mounting the arms at the gauging station for movement into and out of gauging position whereat the rolls are in diametrically opposed contact with said surface, means for yieldingly holding the arms with the gauging rolls in contact with said surface during rotation of the article and allowing movement of the arms corresponding to variations of the diameter of said surface, a differential transformer having a core and transformer windings, means for mounting said core and said windings for relative movement, means for energizing the transformer input windings, means connecting the gauging arms to the differential transformer for relatively moving its core and windings in response to movement of said arms, whereby movement of the arms produces an output voltage by the transformer that is variable with variations in the diameter of said surface, and means for selecting tested articles according to their diametrical dimensions, said means connected to said transformer and actuated responsive to said output voltage whenever the diameter of the surface under test is greater or less than prescribed limits.

12. Apparatus for gauging round surfaces of containers and segregating defective containers from the others comprising means for handling containers by bringing them singly and in succession to a gauging station and transferring them from said station, means at said station for rotating each container about its axis, gauging arms, a gauging roll on each of said arms, means at said station for mounting said arms for movement into and out of gauging position whereat the rolls are in contact with opposite sides of said surface undergoing test, means connected to the arms for moving them into and out of gauging position, means for yieldingly holding the arms in gauging position for keeping the rolls in contact with the rotating container, a differential transformer having a core and coils, means connecting the core and coils, respectively, to said arms, means for energizing the input coil of said transformer to produce an output voltage corresponding to the relative positions of said core and coils as determined by the position of the gauging arms, means connected to the transformer for amplifying the output voltage of the latter, a reject solenoid, means connecting said reject solenoid to said amplifying means for actuating the reject solenoid responsive to an amplified output voltage that is greater than a predetermined magnitude, and means operatively connected to said solenoid and responsive to the actuation thereof for ejecting defective containers from the handling means.

References Cited in the file of this patent

UNITED STATES PATENTS

| 2,338,868 | Owens | Jan. 11, 1944 |
| 2,429,891 | Neff | Oct. 28, 1947 |
| 2,481,863 | Owens | Sept. 13, 1949 |
| 2,601,447 | Neff | June 24, 1952 |
| 2,682,802 | Fedorchak et al. | July 6, 1954 |
| 2,689,409 | Fry | Sept. 21, 1954 |
| 2,696,297 | Matthews | Dec. 7, 1954 |